(12) United States Patent
Wilson-Jones (10) Patent No.: US 11,465,668 B2
(45) Date of Patent: Oct. 11, 2022

(54) HANDWHEEL ACTUATOR ASSEMBLY (71) Applicant: ZF Automotive UK Limited, Solihull (GB)

(72) Inventor: Russell Wilson-Jones, Warwickshire (GB)

(73) Assignee: ZF Automotive UK Limited

( * ) Notice: Subject to any disclaimer, the term of this patent is extended or adjusted under 35 U.S.C. 154(b) by 263 days.

(21) Appl. No.: 16/890,632

(22) Filed: Jun. 2, 2020

(65) Prior Publication Data
US 2020/0377142 A1   Dec. 3, 2020

(30) Foreign Application Priority Data

Jun. 3, 2019 (GB) ...................................... 1907846

(51) Int. Cl.
| B62D 5/00 | (2006.01) |
| B62D 1/10 | (2006.01) |
| B62D 1/20 | (2006.01) |
| B62D 15/02 | (2006.01) |
| B62D 6/06 | (2006.01) |

(52) U.S. Cl.
CPC ............. B62D 5/006 (2013.01); B62D 1/10 (2013.01); B62D 1/20 (2013.01); B62D 6/06 (2013.01); B62D 15/0215 (2013.01)

(58) Field of Classification Search
CPC . B62D 1/10; B62D 1/20; B62D 5/006; B62D 5/04; B62D 5/0403; B62D 5/046; B62D 5/0481; B62D 6/06; B62D 15/0215; G01D 5/145
USPC ........................................................ 180/402
See application file for complete search history.

(56) References Cited

U.S. PATENT DOCUMENTS

| 5,791,432 A | 8/1998 | Fushimi et al. |
| 2019/0245411 A1* | 8/2019 | Strieter ................ H02K 7/1004 |

FOREIGN PATENT DOCUMENTS

| CN | 208134426 U | 11/2018 |
| EP | 3521136 A1 | 8/2019 |

* cited by examiner

Primary Examiner — Anne Marie M Boehler
Assistant Examiner — Felicia L. Brittman
(74) Attorney, Agent, or Firm — Robert James Harwood (57) ABSTRACT A handwheel actuator assembly includes a handwheel shaft configured to receive a handwheel; a feedback device operable to provide a variable level of resistance to rotation of the handwheel shaft; and a handwheel shaft position sensor operable to sense an angular position of the handwheel shaft. The handwheel shaft position sensor may be mounted on a circuit board. The circuit may comprise a controller that is configured to receive signals from the handwheel shaft position sensor.

20 Claims, 5 Drawing Sheets

HANDWHEEL ACTUATOR ASSEMBLY

CROSS-REFERENCE TO RELATED APPLICATION

This application claims priority to German Patent Application No. 1907846.8 filed Jun. 3, 2019, the disclosure of which is incorporated herein by reference in its entirety.

TECHNICAL FIELD

The present disclosure relates to a handwheel actuator assembly for a steer-by-wire electric power-assisted steering system, particularly but not necessarily exclusively for a road vehicle. The disclosure also relates to a steer-by-wire steering system including a handwheel actuator assembly.

BACKGROUND

Conventional steering systems in vehicles provide a mechanical connection between a handwheel operated by a driver and a steering rack or linkage that causes movement of steerable wheels of the vehicle. Such a fixed connection is provided by a steering column assembly. In modern vehicles, an assistive force is also provided, either to a part of the steering column assembly or directly to the steering rack, in order to make the act of steering less difficult. The assistive force is provided by a hydraulic assistance system or, more commonly, by an electric assistance system utilizing electric motors.

However, as electrical systems become more reliable, it can be beneficial to remove the mechanical connection between the handwheel and steerable wheels and to replace it with an electrical connection. An electrical steering connection is generally known as steer-by-wire. These systems can save space, which is at a premium in modern vehicles, and can provide additional benefits, such as enabling enhanced crash protection for vehicle occupants. In addition, steer-by-wire systems may be of particular interest in vehicles that can be made autonomous. In such vehicles, it is necessary to be able to provide full steering control using actuators such as electric motors, rather than simply providing assistance to a driver input.

SUMMARY

According to a first aspect, there is provided a handwheel actuator assembly for a steer-by-wire steering system, the handwheel actuator assembly comprising: a handwheel shaft configured to receive a handwheel; a feedback device operable to provide a variable level of resistance to rotation of the handwheel shaft; and a handwheel shaft position sensor operable to sense an angular position of the handwheel shaft; wherein the handwheel shaft position sensor is mounted on a circuit board, the circuit board comprising a controller that is configured to receive signals from the handwheel shaft position sensor.

As the handwheel shaft position sensor is mounted on the circuit board, no wiring, cabling, or additional connectors are required between the position sensor and circuit board, including the controller. This can improve the reliability of the handwheel shaft position sensor and well as decreasing the manufacturing and assembly costs. Where high-integrity signals are required, it is common to require two wiring harnesses for each sensor, which necessarily increases the space required for wiring. Direct mounting of the handwheel shaft position sensor on the circuit eliminates this necessity.

The circuit board may be a printed circuit board, the handwheel shaft position sensor being connected to the controller via at least one conductive track.

The mounting of the handwheel shaft position sensor on the circuit board can also allow the assembly to be more compact, preventing any wastage of space, particularly in the axial direction of the handwheel shaft. As less space is used by the assembly, an increased adjustment length of the steering assembly can be provided.

The feedback device may be responsive to control signals received from the controller.

The feedback device may comprise an electric motor having a motor shaft, the motor shaft being mechanically coupled to the handwheel shaft, the electric motor being configured to provide the variable level of resistance to rotation of the handwheel shaft.

Using an electric motor as the feedback device is desirable as it not only allows resistance to be applied to the handwheel shaft when used to generate electrical braking, but can also be used to apply force feedback. Force feedback can be particularly desirable in steering systems as it can result in the driver receiving a better steering 'feel' from the steerable wheels, similar to that provided in a conventional mechanical steering assembly.

The assembly may further comprise a motor shaft position sensor operable to sense an angular position of the motor shaft, the motor shaft position sensor being mounted on the circuit board, the circuit board being configured to receive signals from the motor shaft position sensor. Where the circuit board is a printed circuit board, the motor shaft position sensor may be connected to the controller via at least one conductive track.

It may be desirable to include a motor shaft position sensor in order to provide additional signals for tracking movement of the assembly. By mounting the motor shaft position sensor on the circuit board, any intervening connections or wiring can again be eliminated, providing a smaller, more compact, and more reliable assembly.

The motor shaft position sensor may sense the rotation of a motor shaft sensor target associated with the motor shaft.

The motor shaft sensor target may be mounted at or adjacent to a distal end of the motor shaft.

By mounting the sensor target at or close to the end of the motor shaft, the distance between the sensor and sensor target may be minimised.

The handwheel shaft position sensor may sense the rotation of a handwheel shaft sensor target associated with the handwheel shaft.

The handwheel shaft sensor target may be fixed to the handwheel shaft.

The assembly may further comprise a motor shaft gear fixed to the motor shaft and a handwheel shaft gear fixed to the handwheel shaft, the motor shaft gear and handwheel shaft gear being rotationally coupled.

Rotationally coupling the motor shaft gear and handwheel shaft gear ensures that the gears and their associated shafts rotate together and therefore motion and feedback can be passed directly between them. It also may allow the position sensors to work together to provide enhanced accuracy.

The motor shaft gear may mesh directly with the handwheel shaft gear.

The assembly may further comprise an additional motor gear that meshes with the motor shaft gear, the handwheel shaft sensor target being fixed to the additional motor gear.

As the initial positions of the motor gear and additional motor gear will be known, by sensing the position of each gear—whilst having a non-unitary gear ratio, such that each gear rotates at a different speed—the Vernier algorithm can be used to determine the absolute position of the motor shaft. As the initial position of the handwheel shaft will also be known, the absolute position of the handwheel shaft can be determined with reference to the absolute position of the motor shaft. Thus, the handwheel shaft sensor target need not necessarily be in direct communication with the handwheel shaft.

The Vernier algorithm works best when the gear sizes are similar, and therefore having a similarly-sized additional motor gear is advantageous over using the Vernier algorithm with sensors directly attached to the motor shaft and the handwheel shaft, as the gear ratio between the motor gear and handwheel gear is likely to be much larger.

The assembly may further comprise an additional handwheel gear that meshes with the handwheel shaft gear, the handwheel shaft sensor target being fixed to the additional handwheel gear.

This allows the circuit board to be positioned further away from the handwheel shaft. This may allow an even more compact assembly and may allow components to be more tightly spaced on the circuit board.

The assembly may further comprise a belt-drive coupling that rotationally couples the motor shaft to the handwheel shaft.

The belt-drive may include a toothed drive belt that engages with correspondingly toothed drive wheels.

Use of a toothed drive belt can prevent slippage of the belt-drive coupling and provide a more effective transmission of rotation or retardation between the motor shaft and the handwheel shaft.

The belt-drive coupling may include an idler wheel.

The idler wheel may provide a separate place for mounting sensor targets and may also be used to take up slack within the belt-drive coupling. The idler wheel and/or a shaft on which it is mounted may be biased so as to automatically remove slack within the system.

The motor shaft sensor target or the handwheel shaft sensor target may be fixed to the idler wheel.

The feedback device may comprise an electrically-controlled brake or damper.

The electrically-controlled brake or damper may act on the handwheel shaft.

Use of a brake or damper may provide a less complicated assembly that can still provide resistance to the movement of the handwheel shaft.

The circuit board may include a cut-out or aperture through which the handwheel shaft and/or the motor shaft pass.

The motor shaft may be parallel with the handwheel shaft.

The circuit board may extend perpendicularly to the motor shaft and handwheel shaft.

The motor shaft position sensor, handwheel shaft position sensor, and a gear ratio between the motor shaft and handwheel shaft may be selected to allow the Vernier principle to be applied to measure more than one rotation of the handwheel shaft.

Accurately detecting not only where the handwheel shaft is at within a rotation but also what number of rotations it has passed through allows full determination of position, for example from lock to lock of the steering wheel. This can be useful to a system when determining the level of feedback to be applied and also when determining the position of the steering wheel at start-up of the vehicle.

The handwheel shaft may include a torque sensor operable to sense torque applied by a driver to the handwheel shaft.

The use of a torque sensor may be useful in determining the signals to transmit to a steering actuator assembly.

A stator of the torque sensor may be mounted on the circuit board, the controller being configured to receive signals from the torque sensor.

By mounting the stator of the torque sensor on the circuit board, the overall size of the assembly can be limited.

According to a second aspect, there is a provided a steer-by-wire steering system for a vehicle, the steering system comprising: a handwheel actuator according to the first aspect; and a steering actuator assembly comprising: a steering linkage for connection to steerable wheels of the vehicle; and a steering motor configured to act on the steering linkage to steer the steerable wheels in response to signals received from the handwheel actuator assembly.

The feedback device of the handwheel actuator assembly may vary the level of resistance provided to the handwheel shaft in response to signals received from the steering actuator assembly.

BRIEF DESCRIPTION OF THE DRAWINGS

Embodiments will now be described with reference to the accompanying drawings, in which.

DETAILED DESCRIPTION

Referring firstly to FIGS. 1 to 4, there is shown a first embodiment of a handwheel actuator assembly 100. The handwheel actuator assembly 100 includes a handwheel shaft 102 on which a handwheel (not shown) can be mounted. The handwheel shaft 102 is mechanically connected to a feedback device in the form of an electric motor 104 having a motor shaft 106. A motor gear 108 fixed to the motor shaft 106 is meshed with a handwheel gear 110 fixed to the handwheel shaft 102, providing the mechanical connection between the two. The motor shaft 106 and handwheel shaft 102 are positioned parallel to one another, with a radial separation sufficient to accommodate their geared connection.

The electric motor 104 provides variable resistance and preferably also feedback from a steering actuator assembly that is electrically connected to the handwheel actuator assembly 100, in use. This resistance is delivered to the handwheel shaft 102 via the motor gear 108 and handwheel gear 110, providing enhanced steering 'feel' to a driver of the vehicle to which the handwheel actuator assembly 100 is attached. Further discussion of the steering actuator assembly is provided in reference to FIG. 5.

In order to provide the required feedback and to transmit driver inputs from the handwheel shaft 102 to the steering actuator assembly, it is necessary to be able to sense the angular positions of the handwheel shaft 102—and thus the handwheel—and preferably also the electric motor 104. A series of positions sensors are therefore included, the position sensors being mounted to a circuit board 112 that, in the present embodiment, extends in a direction perpendicular to the motor shaft 106 and handwheel shaft 102.

A motor shaft position sensor 114 is mounted on the circuit board 112 and is configured to detect the movement of a motor shaft sensor target 116 fixed to the end of the motor shaft 106. The signals detected by the motor shaft position sensor 114 are fed to a controller 118 of the circuit board 112, the signals being used to determine a rotational position of the motor shaft 106. The controller 118 of the depicted embodiment is a printed circuit board including conductive tracks that interconnect the components mounted on the circuit board.

A series of three handwheel shaft position sensors 120 are also mounted on the circuit board 112 and are configured to detect the movement of a handwheel shaft sensor target 122 fixed to the handwheel shaft 102. The signals detected by the handwheel shaft position sensors 120 are fed to the controller 118, the signals being used to determine a rotational position of the handwheel shaft 102.

The sensors and sensor targets described throughout the application may be any sensor and target that is suitable for detecting the rotation of the shafts. For example, the sensors may be Hall sensors and the sensor targets may comprise one or more magnets. Other suitable sensors and sensor targets will be known to the skilled person in view of the present disclosure.

The rotational positions of the motor shaft 106 and handwheel shaft 102 can be used by the controller 118 to assist in the production of control signals for the system. Most importantly, an accurate handwheel shaft angle is required in order to provide the requisite signals to a steering actuator assembly that can translate angular movement of the handwheel shaft 102 to angular movement of steerable wheels of a vehicle. As an additional example, knowing the position of the motor shaft 106 and handwheel shaft 102 can help ensure that the feedback being provided by the motor 104 is as requested by the controller 118.

As the handwheel shaft 102 is mechanically connected to the motor shaft 106, the rotational position signals from the handwheel shaft 102 and motor shaft 106 can be combined in order to provide more accurate position signals. For example, by ensuring that a suitable gear ratio is present in the transmission from handwheel shaft 102 to motor shaft 106 and a specific alignment of position sensors 114, 120 is provided, the Vernier principle can be used to provide a more accurate indication of the handwheel shaft position. Such a principle is well-known in the art and the skilled person would readily be able to implement such an arrangement of sensors on the present apparatus.

Figure 1:
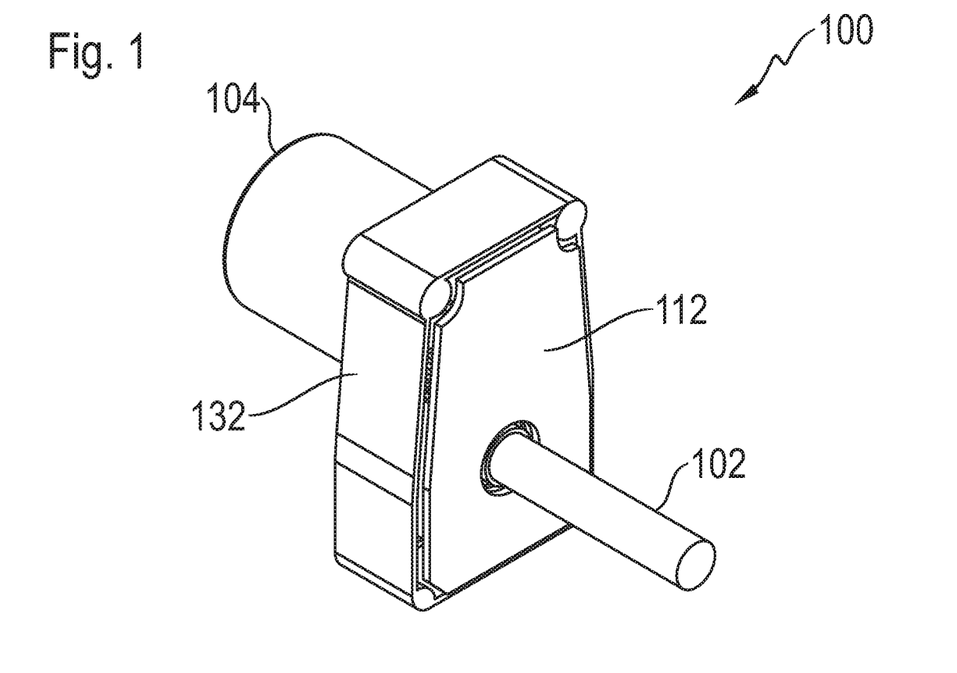
FIG. 1 is a perspective view of a handwheel actuator assembly according to the first aspect.
Figure 2:
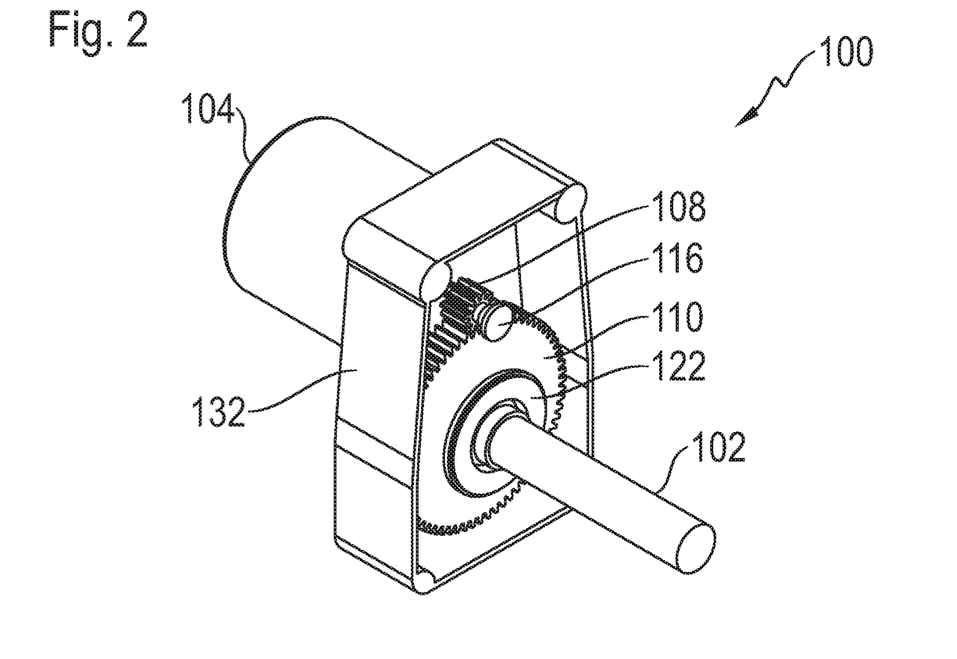
FIG. 2 is a perspective view of the handwheel actuator assembly of FIG. 1 with the circuit board omitted.
Figure 3:
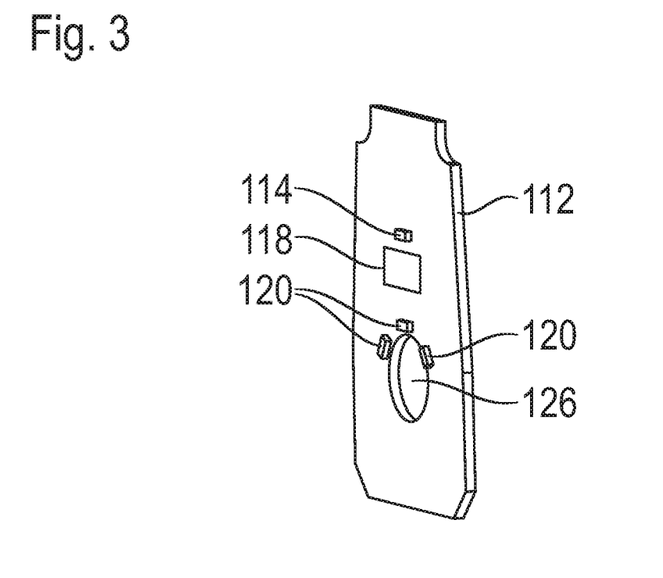
FIG. 3 is a reverse perspective view of the circuit board shown in FIG. 1, showing the position sensors.
Figure 4:
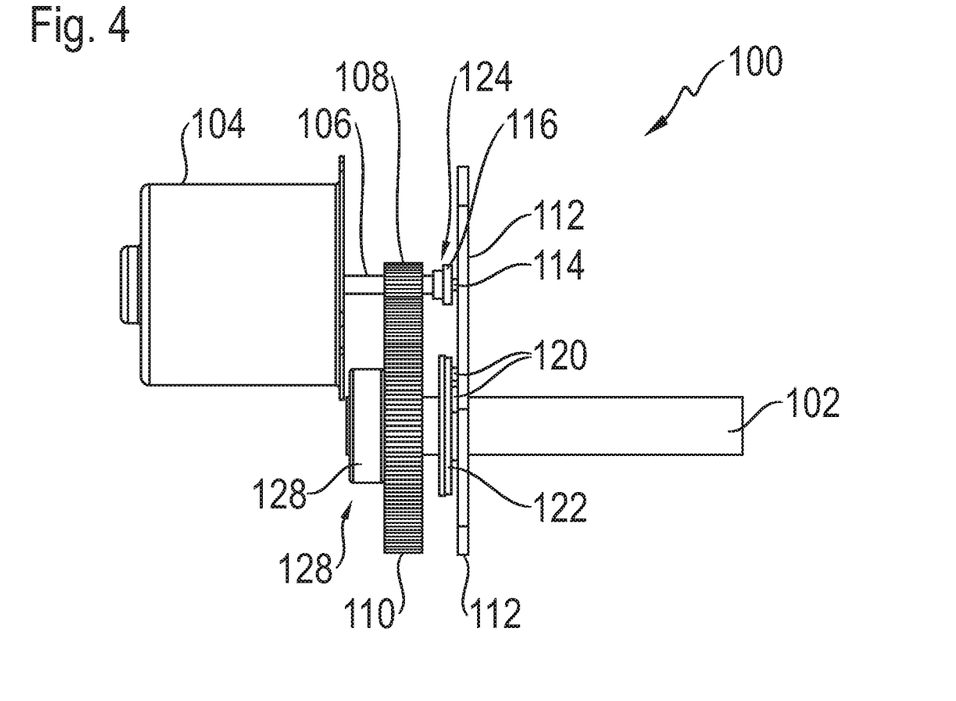
FIG. 4 is a side view of the handwheel actuator assembly of FIG. 1, with the housing omitted.

In the depicted handwheel actuator assembly 100, the circuit board 112 is positioned adjacent to a distal end 124 of the motor shaft 106 with the handwheel shaft 102 passing through an aperture 126 in the circuit board 112. The motor shaft sensor target 116 and the handwheel shaft sensor target 122 are located adjacent to the circuit board 112, between the circuit board 112 and the motor gear 108 and handwheel gear 110, in order that the motor shaft position sensor 114 and handwheel shaft position sensors 120 are next to their respective sensor targets 116, 122. The handwheel shaft 102 is supported by a bearing assembly 128 that is provided at a distal end 130 of the handwheel shaft 102 and mounted to a housing 132 that encloses the gears 108, 110 and position sensors 116, 122, as shown in FIG. 1.

Although this particular arrangement is shown in the present embodiment, other arrangements are also possible. For example, the circuit board could be mounted adjacent to the distal end of the handwheel shaft and include an aperture through which the motor shaft passes, with the handwheel shaft sensor target being fixed to the distal end of the handwheel shaft and the motor shaft sensor target being positioned between the motor gear and the electric motor. The circuit board need not necessarily contain any apertures, and the position sensors could be arranged such that apertures are not necessary.

Figure 5:
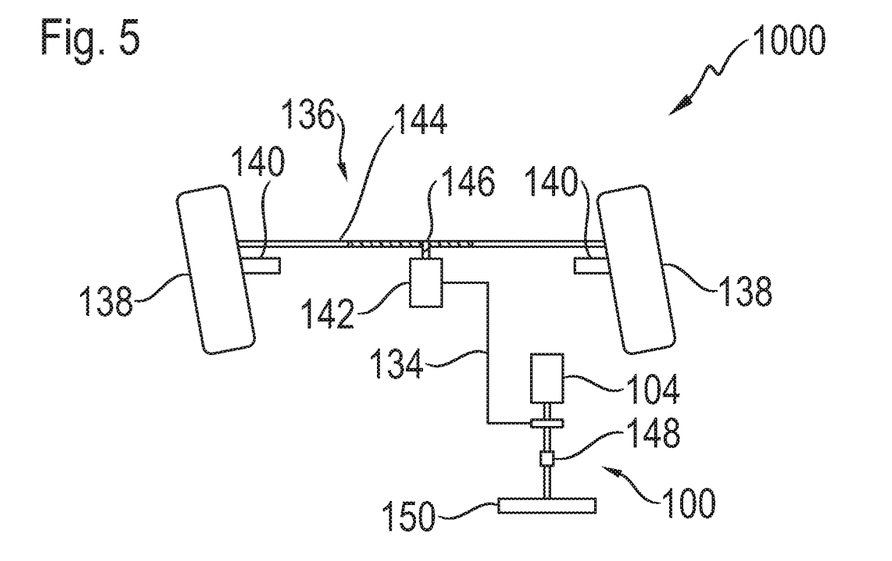
FIG. 5 is a diagrammatic view of a steer-by-wire steering system according to the second aspect.

In FIG. 5, a steer-by-wire steering system 1000 for a vehicle is shown. The system 1000 includes a handwheel actuator assembly 100, which is electrically connected via a cable 134 to a steering actuator assembly 136. The handwheel actuator assembly 100 is identical to that shown in FIGS. 1 to 4 and therefore further description is omitted. The steering actuator assembly 136 controls the rotational movement of two steerable wheels 138 of a vehicle. The steerable wheels 138 are connected to the vehicle via two stub axles 140. The remainder of the vehicle is not shown.

The steering actuator assembly 136 includes an electric motor, referred to hereon in as a steering motor 142, that engages with a steering linkage 144 connected to the steerable wheels 138. In the depicted embodiment, the steering motor 142 engages using a rack and pinion gearing system 146, a worm reduction gear (not shown) being interposed between the motor and pinion. However, other methods of engagement may also be used in place of the rack and pinion gearing system 146.

A torque sensor 148 is located on the handwheel shaft 102 and provides torque readings indicative of a torque applied to the handwheel shaft 102 by the motor 104. The torque sensor 148 therefore helps to ensure that the torque feedback provided to the driver is correct.

The circuit board 112 transmits a signal based on the measured angle of the handwheel shaft 102 to the steering motor 142, which translates these signals into movements of the steering linkage 144 and steerable wheels 138.

As well as reacting to signals received from the controller 118, the steering actuator assembly 136 provides signals back to the controller 118, these signals being indicative of the forces being applied to the steerable wheels 138 and steering linkage 144, for example due to external influences such as road surface and camber. These signals provided to the controller 118 from the steering actuator assembly 136 are used by the controller 118 to control the feedback device—here the electric motor 104—in order to provide feedback to the driver through a steering wheel 150. As mentioned above, the torque sensor 148 may then be used to regulate, check, or control the feedback torque that is experienced by the driver. The use of and methods for transmission and translation of feedback signals to the feedback device are well-known in the art and will not be discussed further in the present application.

Figure 6:
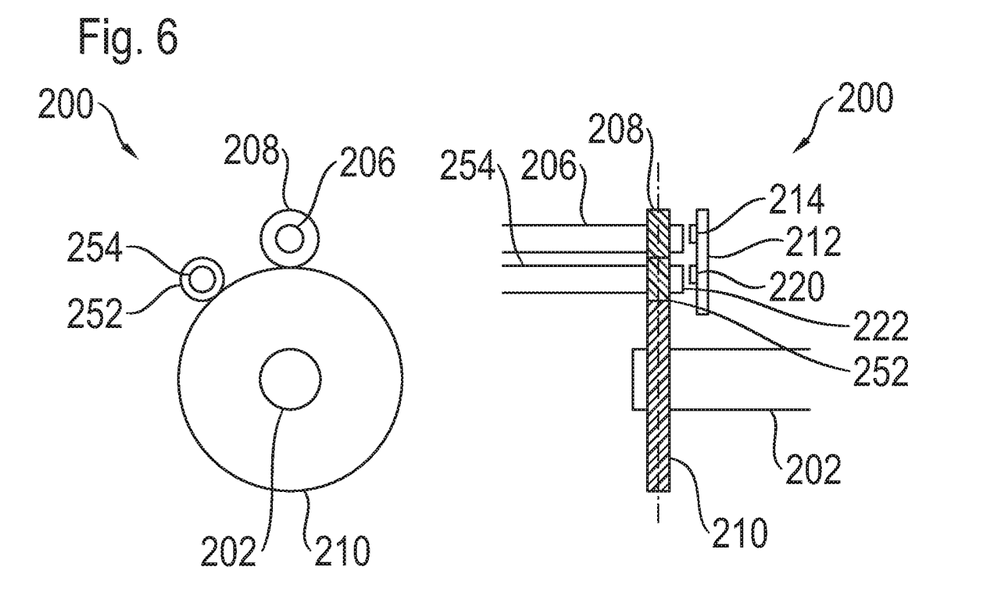
FIG. 6 shows a side view and sectional view of an embodiment of a handwheel actuator assembly including an additional gear.

FIG. 6 shows a second embodiment of a handwheel actuator assembly 200. The handwheel actuator assembly 200 is similar to the first embodiment and therefore extensive description of similar or identical parts is omitted. The handwheel actuator assembly 200 includes a handwheel shaft 202 with a handwheel gear 210, which meshes with a motor gear 208 on a motor shaft 206.

An additional gear 252 is also provided, the additional gear 252 meshing with the handwheel gear 210. The additional gear 252 is mounted on an additional shaft 254 that is supported by the housing (not shown). The handwheel shaft sensor target 222 is fixed to the additional gear 252, more specifically on the end of the additional shaft 254. As the handwheel shaft sensor target 222 is now remote from the handwheel shaft 202, the circuit board 212 can be made smaller due to it not being required to be in the direct vicinity of the handwheel shaft 202. The position sensors 214, 220 remain on the circuit board, but can be closer together than they could be when the handwheel shaft sensor target 222 was fixed to the handwheel shaft 202. This allows for a more compact handwheel actuator assembly 200.

The Vernier algorithm can be used with the outputs of the motor shaft position sensor 214 and handwheel shaft position sensor 222 in order to determine the absolute angle of the motor shaft 206. As the ratio and relative starting positions of the motor shaft 206 and handwheel shaft 202 will be known, this algorithm will also enable the absolute position of the handwheel shaft 202 to be determined.

Figure 7:
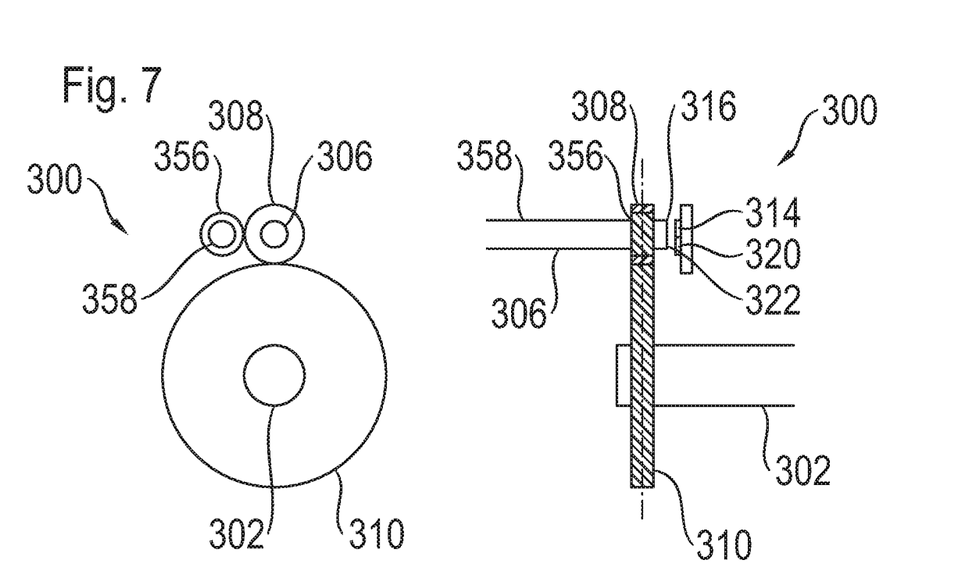
FIG. 7 shows a side view and sectional view of another embodiment of a handwheel actuator assembly including an additional gear.

FIG. 7 shows a third embodiment of a handwheel actuator assembly 300. The handwheel actuator assembly 300 is similar to the first embodiment and therefore extensive description of similar or identical parts is omitted. The handwheel actuator assembly 300 includes a handwheel shaft 302 with a handwheel gear 310, which meshes with a motor gear 308 on a motor shaft 306.

The third embodiment also includes an additional gear 354 mounted on an additional shaft 356, in the same way as in FIG. 6. However, in this embodiment, the additional gear 354 is meshed with the motor gear 356. The handwheel shaft sensor target 322 is fixed to the additional gear 356 rather than to the handwheel shaft 302, its position being sensed by the handwheel shaft position sensor 320. The motor shaft sensor target 316 remains on the motor shaft 306, as in the previous embodiment. Whilst the handwheel shaft sensor target 322 is therefore not directly connected to the handwheel shaft 302, the Vernier algorithm can be used with the outputs of the motor shaft position sensor 314 and handwheel shaft position sensor 322 in order to determine the absolute angle of the motor shaft 306. As the ratio and relative starting positions of the motor shaft 306 and handwheel shaft 302 will be known, this algorithm will also enable the absolute position of the handwheel shaft 302 to be determined.

Of course, multiple additional gears could be provided. For example, one additional gear could mesh with the motor gear and carry the motor shaft sensor target and a second additional gear could mesh independently with the handwheel gear and carry the handwheel shaft sensor target. In some circumstances, it may also be desirable to include one or more intermediate gears that form a gear train between the motor gear and handwheel gear.

Figure 8:
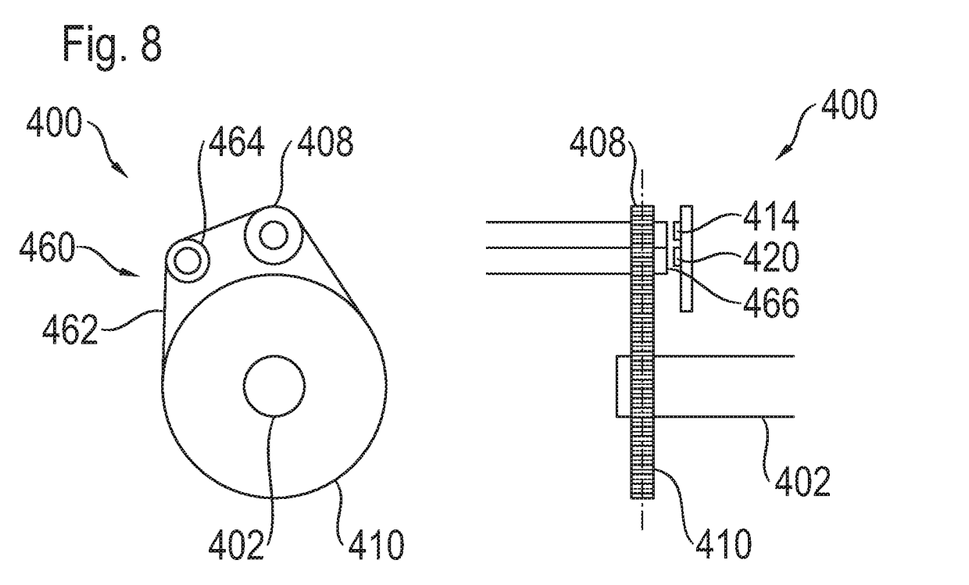
FIG. 8 shows a side view and sectional view of an embodiment of a handwheel actuator assembly including a belt-drive coupling.

In FIG. 8, a fourth embodiment of a handwheel actuator assembly 400 is shown. In the fourth embodiment, the handwheel gear 410 and motor gear 408 are interconnected by a belt-drive coupling 460 comprising a toothed belt 462 and an idler wheel 464. The idler wheel 464 includes a sensor target 466 that the handwheel shaft position sensors 420 can use to indirectly measure the position of the handwheel shaft 402. Use of a toothed belt 462 ensures that the effect of stretching of the belt 462 over time will not result in a significant decrease in the accuracy of the position sensors 414, 420. As with the second embodiment, this can result in a compact arrangement for the circuit board 412 and overall handwheel actuator assembly 400.

Figure 9:
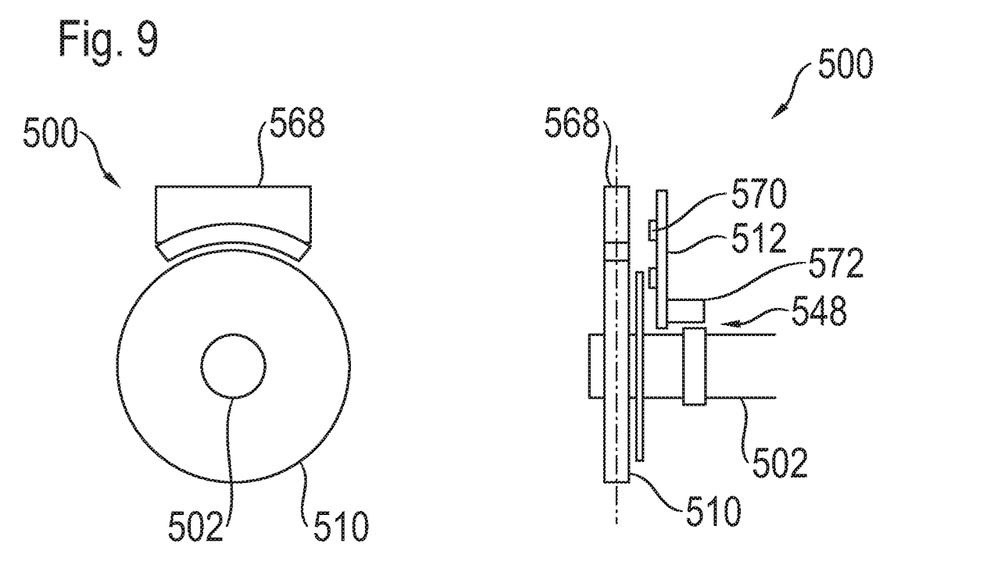
FIG. 9 shows a side view and sectional view of an embodiment of a handwheel actuator assembly including an electrically-controlled brake and torque sensor.

A fifth embodiment of a handwheel actuator assembly 500 is shown in FIG. 9. The fifth embodiment differs from the previous embodiments in that the handwheel shaft 502 is fixed to a handwheel gear 510 which is acted on by an electrically-controlled brake 568 or damper. The brake 568 is therefore the feedback device of the handwheel actuator assembly 500 and takes the place of the electric motor of previous embodiments. Of course, the brake 568 of the present embodiment cannot impart motion to the handwheel shaft 502 as a form of feedback, but instead is limited to providing resistance to movement of the handwheel shaft 502. In this embodiment a position sensor 570 is provided for sensing the position of the brake 568, for control purposes.

The handwheel actuator assembly 500 also includes a torque sensor 548. The torque sensor 548 acts to detect the torque in the handwheel shaft 502 and a stator part 572 of the torque sensor 548 is mounted on the circuit board 512, ensuring that the compactness of the handwheel actuator assembly 500 is maintained. The torque sensor 548 communicates with the controller mounted on the circuit board 512 and may therefore influence the signals provided by the controller. The torque sensor 548 may take the form of any suitable torque sensor and may, for example, be a magnetoelastic torque sensor.

Throughout the application, the feedback device has been described as an electric motor, a brake, or a damper. It will be apparent that the feedback device could be any device by which a variable level of resistance and/or motion can be provided to the handwheel shaft, in order that feedback can be provided to the driver. Such devices will be apparent to the skilled person in view of the present disclosure.

What is claimed is:

1. A handwheel actuator assembly for a steer-by-wire steering system, the handwheel actuator assembly comprising:
    a handwheel shaft configured to receive a handwheel, a handwheel shaft gear being fixed to the handwheel shaft;
    a feedback device comprising an electric motor having a motor shaft, a motor shaft gear being fixed to the motor shaft, the motor shaft gear being rotationally coupled and directly meshed to the handwheel shaft gear, the feedback device being operable to provide a variable level of resistance to rotation of the handwheel shaft via the electric motor; and
    a handwheel shaft position sensor operable to sense an angular position of the handwheel shaft;
    wherein the handwheel shaft position sensor is mounted on a circuit board, the circuit comprising a controller that is configured to receive signals from the handwheel shaft position sensor.

2. A handwheel actuator assembly according to claim 1, wherein the feedback device is responsive to control signals received from the controller.

3. A handwheel actuator assembly according to claim 1, further comprising a motor shaft position sensor operable to sense an angular position of the motor shaft, the motor shaft position sensor being mounted on the circuit board, the circuit board being configured to receive signals from the motor shaft position sensor.

4. A handwheel actuator assembly according to claim 3, wherein the motor shaft position sensor senses the rotation of a motor shaft sensor target associated with the motor shaft.

5. A handwheel actuator assembly according to claim 4, wherein the motor shaft sensor target is fixed to the motor shaft.

6. A handwheel actuator assembly according to claim 5, wherein the motor shaft sensor target is mounted at or adjacent to a distal end of the motor shaft.

7. A handwheel actuator assembly according to claim 1, wherein the handwheel shaft position sensor senses the rotation of a handwheel shaft sensor target associated with the handwheel shaft.

8. A handwheel actuator assembly according to claim 7, wherein the handwheel shaft sensor target is fixed to the handwheel shaft.

9. A handwheel actuator assembly according to claim 1, further comprising an additional motor gear that meshes with the motor shaft gear, the handwheel shaft sensor target being fixed to the additional motor gear.

10. A handwheel actuator assembly according to claim 1, further comprising an additional handwheel gear that meshes with the handwheel shaft gear, the handwheel shaft sensor target being fixed to the additional handwheel gear.

11. A handwheel actuator assembly according to claim 1, wherein the motor shaft is parallel with the handwheel shaft, optionally wherein the circuit board extends perpendicularly to the motor shaft and handwheel shaft.

12. A handwheel actuator assembly according to claim 1, further comprising a motor shaft position sensor operable to sense an angular position of the motor shaft, wherein the motor shaft position sensor, handwheel shaft position sensor, and a gear ratio between the motor shaft and handwheel shaft are selected to allow the Vernier principle to be applied to measure more than one rotation of the handwheel shaft.

13. A handwheel actuator assembly according to claim 1, further comprising a motor shaft position sensor operable to sense an angular position of the motor shaft, wherein the motor shaft position sensor and handwheel shaft position sensor are of a type whereby data from the motor shaft position sensor and handwheel shaft position sensor can be combined to produce an absolute position of the handwheel shaft.

14. A handwheel actuator assembly according to claim 1, wherein the circuit board includes a cut-out or aperture through which the handwheel shaft and/or the motor shaft pass.

15. A handwheel actuator assembly for a steer-by-wire steering system, the handwheel actuator assembly comprising:
a handwheel shaft configured to receive a handwheel;
a feedback device including an electric motor having a motor shaft, the feedback device being operable to provide a variable level of resistance to rotation of the handwheel shaft via the electric motor;
a belt-drive coupling having an idler wheel and a drive belt that rotationally couples the motor shaft, the handwheel shaft and the idler wheel, and
a handwheel shaft position sensor operable to sense an angular position of the handwheel shaft;
wherein the handwheel shaft position sensor is mounted on a circuit board, the circuit comprising a controller that is configured to receive signals from the handwheel shaft position sensor.

16. A handwheel actuator assembly according to claim 15, wherein the drive belt has teeth that engage teeth associated with the motor shaft, the handwheel shaft and the idler wheel.

17. A handwheel actuator assembly according to claim 15, wherein the handwheel shaft position sensor senses the angular position of the handwheel shaft via a sensor target that is fixed to the idler wheel.

18. A handwheel actuator assembly according to claim 15, further comprising a motor shaft position sensor operable to sense an angular position of the motor shaft, the motor shaft position sensor being mounted on the circuit board, the circuit board being configured to receive signals from the motor shaft position sensor.

19. A handwheel actuator assembly according to claim 18, wherein the motor shaft position sensor senses the rotation of a motor shaft sensor target associated with the motor shaft.

20. A handwheel actuator assembly according to claim 15, wherein the handwheel shaft position sensor senses the rotation of a handwheel shaft sensor target associated with the handwheel shaft.

* * * * *